Sept. 4, 1962 G. GRECO 3,052,288
APPARATUS FOR PRODUCING SYNTHESIS GAS CONTAINING CO AND $H_2$
WITHOUT CATALYSTS
Original Filed Sept. 26, 1955
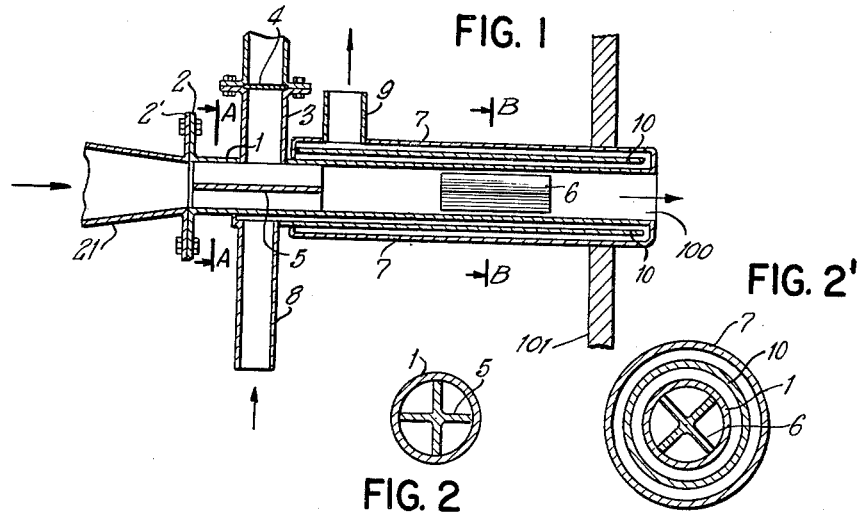
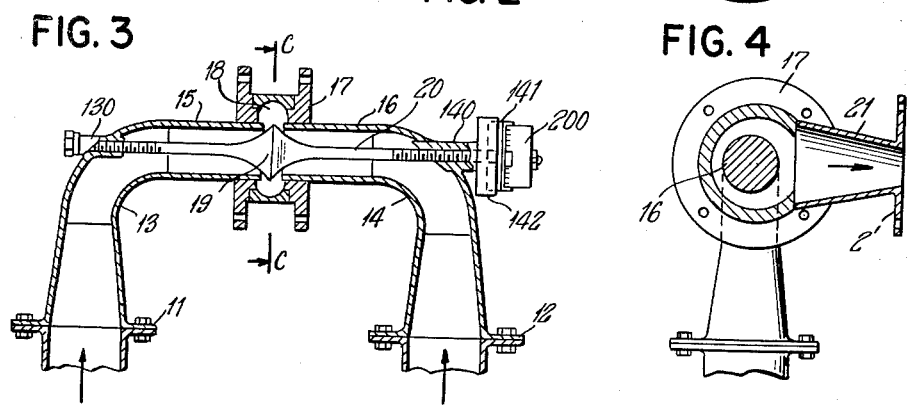
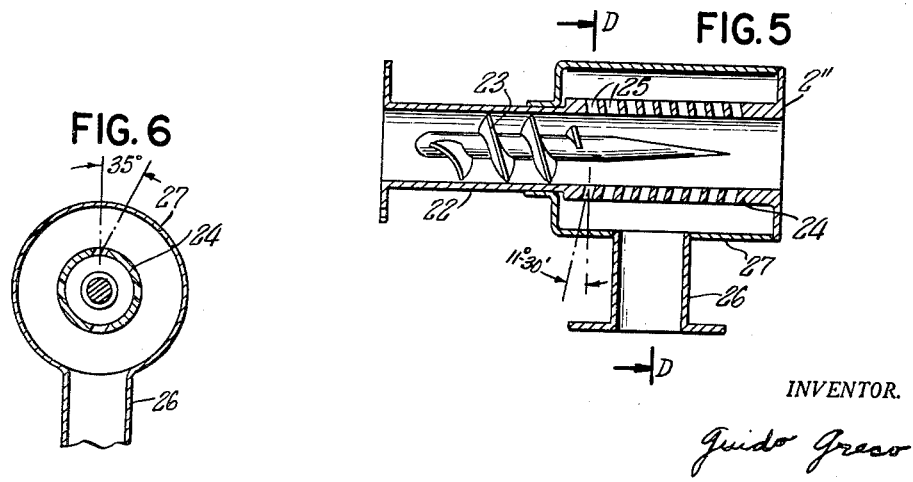
INVENTOR.
Guido Greco

United States Patent Office 3,052,288
Patented Sept. 4, 1962

3,052,288
APPARATUS FOR PRODUCING SYNTHESIS GAS CONTAINING CO AND $H_2$ WITHOUT CATALYSTS
Guido Greco, Milan, Italy, assignor to Montecatini, Societa Generale per l'Industria Mineraria e Chimica, Milan, Italy, a corporation of Italy
Original application Sept. 26, 1955, Ser. No. 536,510, now Patent No. 2,859,103, dated Nov. 4, 1958. Divided and this application Sept. 26, 1956, Ser. No. 612,184
Claims priority, application Italy Sept. 28, 1954
1 Claim. (Cl. 158—118)

This application is a division of patent application Serial No. 536,510, filed September 26, 1955, and now Patent No. 2,859,103.

The present invention relates to the production of synthesis gas that is carbon monoxide and hydrogen, by means of the partial combustion of methane, or other gaseous aliphatic hydrocarbon, with oxygen in the absence of catalysts, being particularly directed to devices for carrying out this process.

In his Italian Patent No. 446,318 the applicant has described a process for the production of synthesis gas from gaseous aliphatic hydrocarbons and oxygen. In a first stage of that process the two gases are reacted with each other in the form of a swirling mixture and thereafter, in a second stage, the gas mixture is further reacted by means of the heat set free in the first reaction stage and in the presence of known catalysts. For this purpose, the hydrocarbon gas and the oxygen are introduced into the combustion chamber by means of nozzles. This manner of introduction, which produces a strong swirling motion of the gases, and the arrangement of the first stage reaction chamber adjacent to a catalysis chamber provided for the second stage of the reaction, permits the use of practically pure and undiluted hydrocarbons and oxygen in contrast to previously described processes of this type. Moreover, the process avoids the formation of undesirable gas black. It was the formation of gas black and the incomplete conversion of methane which, until the said invention, caused the failure of every attempt to employ practically (95–100%) pure hydrocarbons, without the addition of any inert gases or steam in carrying out the process illustrated by the following known equations:

*First Stage.*—(Exothermic):

(I) 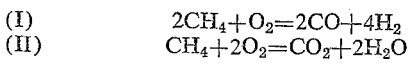   $2CH_4+O_2=2CO+4H_2$
(II) 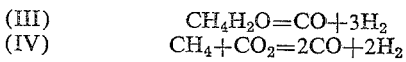  $CH_4+2O_2=CO_2+2H_2O$

*Second Stage.*—Endothermic, supported by the heat liberated in first stage):

(III)         $CH_4H_2O=CO+3H_2$
(IV)         $CH_4+CO_2=2CO+2H_2$

It is the principal object of this invention to improve upon the foregoing process by furnishing a method of operation which, aside from avoiding the formation of gas black and reducing the amount of methane in the final gaseous reaction mixture to a minimum, represents a substantial improvement in (*a*) eliminating the use of catalysts, (*b*) demanding substantially little reactor space, (*c*) not requiring the supply of outside heat and (*d*) requiring unexpectedly low reaction temperatures (about 900° C.) while using 95–100% pure hydrocarbon, without the addition of any inert gas or steam.

It is another object of the invention to furnish devices by which the improved process of producing synthesis gas may be carried out.

The invention will best be understood from the following description of several preferred embodiments of the herein claimed devices taken in conjunction with the accompanying drawings, in which:

FIG. 1 is a schematic sectional view of a burner (outlet tube).

FIGS. 2 and 2' are cross-sectional views on the lines AA and BB, respectively, in FIG. 1, FIG. 3 is a schematic sectional view of one embodimen of a premixer of the present invention, FIG. 4 is a cross-sectional view on the line CC in FIG. 3, FIG. 5 is a schematic sectional view of another embodiment of a premixer of the present invention, and FIG. 6 is a cross-sectional view on the line DD in FIG. 5.

In the process carried out in accordance with the present invention a very complete premixing of the reaction gases, such as $CH_4$ and $O_2$, is executed outside the reaction chamber. This is attained by impacting the respective gas streams upon each other. For this purpose the effective components of the kinetic energies of the two gases or, expressed differently, the aliquots of the kinetic energies of the gas flow rates relating to the opposite direction components of the velocities of the two reacting gases, should be equal and preferably of the order of 100–200 kgm./$Nm.^3$ of $CH_4$ ($Nm.^3$ representing one cubic meter of gas at 20° C. and 1 atm. pressure). Corresponding values for other gaseous hydrocarbons than methane may be readily established by means of the formula $e=Mv.^2/2$. The burners according to the present invention are particularly adapted for this principle of operation. The construction of these burners permits the before-mentioned intimate mixing of the two reaction gases. If operated at atmospheric pressure, the load losses in conjunction with these burners are very low, being of the order of 500 kg./$m.^2$.

The gaseous mixture obtained by means of the herein disclosed process consists of $H_2$, CO, $CO_2$, $H_2O$ and about 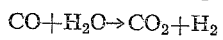 0.2% by volume of residual $CH_4$. It has a $H_2/CO$ ratio of about 2 and a $CO_2$ content of the order of 1% by volume. In view of this composition, and the absence of any gas black, the gaseous mixture can be used directly and without any after-treatment in a second reactor for the manufacture of methanol or of products of the Fischer-Tropsch synthesis.

On the other hand, a second reactor is always a necessity where carbonmonoxide must be further reacted in order to produce hydrogen according to the formula $$CO+H_2O \rightarrow CO_2+H_2$$

when the gas mixture is to be employed in the synthesis of ammonia.

As previously mentioned, the possibility of a partial combustion, at a temperature not above 1000° C. and preferably of about 900° C., of practically pure (95–100%) gaseous hydrocarbons, with oxygen, in the absence of any catalyst and inert gas or steam, and of obtaining thereby a gaseous mixture consisting primarily of CO and $H_2$, including only about 0.2% by volume of $CH_4$ and without the formation of gas black constitutes a substantial improvement over prior art, including applicant's prior process disclosed in said Italian patent.

The two reacting gases are premixed and introduced into the oven or reactor by means of one or by several burners, each consisting of a pre-mixer and an outlet tube. According to this invention, the necessary intimate premixing is predicated upon the force of impact and the respective directions of the two gas streams, which must be such as to insure a high level of that component of the velocity which is essential for the impact and the mutual penetration of the two gas streams. Moreover, two extremely thin streams must be produced in order to attain a microscopically uniform composition of the mixed gas stream entering into the burner.

The herein disclosed novel conception has been confirmed by subsequent experiments which prove that the factors determining the efficiency of mixing are the value of the tangential component of the energy of the two flows, the rotational energy and the time of residence of the mixture in the burner. Exceeding certain energy limits, the second factor prevails over the first. By means of these experiments it has been confirmed that, with burners applying the above-mentioned principle of premixing and with kinetic energy components of an effectiveness as previously set forth, the desired results are readily obtained.

Referring now in detail to the drawings, the pre-mixers illustrated in FIGS. 3 and 5 are meant to be applied to the burner or outflow tube of FIG. 1. This burner consists substantially of the outflow tube 1 itself, applied by means of a flange 2, to the corresponding flange 2' or 2'' of the premixer shown in FIG. 4 or that of FIG. 5, respectively. From the pre-mixer the hydrocarbon, for example methane, -mixed with oxygen,- enters the outflow tube in the direction of the arrow. Near the front section, which is fastened to the premixer, tube 1 is provided with a branch pipe 3 having a safety outlet 4. By means of a partition 5, the front section of the tube is subdivided into several longitudinal outflow chambers, as shown, for example, in the cross-sectional view of FIG. 2. The rear section of tube 1 is subdivided in a similar manner by means of a partition 6. However, as indicated in FIG. 2', the walls of this partition are angularly offset, at 45°, for example with respect to the walls of partition 5. Tube 1 is cooled by means of a double-wall water jacket 7, having an inlet 8 and an outlet 9 for the cooling water, whereby the walls of the jacket are arranged so as to cause the cooling water to circulate in opposite directions along the two faces of interior wall 10 of the jacket.

The swirling gases pass from the mixing device of FIG. 3, or that of FIG. 5, to the tube 1. Tube 1 was termed an outflow tube, above. It is attached by the outlet of the mixing device, and provides the outflow passage for the gas mixture into the combustion chamber. Tube 1 has an outlet at 100, the gases passing therefrom into the combustion chamber or oven or reactor, a wall of which is indicated at 101. As stated above, the two reacting gases are pre-mixed and introduced into the oven or reactor by means of one or several burners, each consisting of a pre-mixer, i.e. that of FIG. 3 or FIG. 5, and an outlet tube for the pre-mixer.

FIG. 3 shows a mixer into which the reaction gases, for example, $O_2$ and $CH_4$ enter through two flared ports 11 and 12, respectively. By means of connecting elbow pieces 13 and 14 these ports are joined with tubes 15 and 16 which are in axial alignment and are held at their free extremities by a mixing chamber. The latter comprises a cylindrical section which is provided with sleeves 17 and an annular hollow member 18 and contains an axially displaceable double-coned obturator or proportioning valve 19, preferably made of stainless steel. As shown, this valve is controlled by a spindle 20, which is provided with a thumbscrew 200 having a scale for varying the size of the inlet openings for oxygen and the hydrocarbon and for indicating the ratio between these opening. Spindle 20 is screw-threadedly mounted for rotation in studs 130 and 140 fixed upon elements 13 and 14 respectively. An indicator sleeve 141 is carried in flange member 142, which is fixed upon a stud 140. By means of this valve, the velocity, stream size and impact angle of the two gas streams are readily controlled. Thus the effective components of the kinetic energy of the gas streams, as specified above, can be easily regulated. The double-cone 19 deviates, or deflects, the two gas jets of oxygen and methane, for example coming from the two oppositely aligned ducts 11, 13, 15 and 12, 14, 16, respectively, into the single peripheral annular recess 18. From the latter, the mixed gases pass through conduit 21 into the outflow tube 1 of the burner illustrated in FIG.

1. The shape of double coned member 19 makes the gas streams meet with velocities having substantial and oppositely directed axial components. In this way the desired mixing is achieved.

Another embodiment of the premixer is shown in FIGS. 5 and 6. This mixer comprises an inlet tube 22 for the gas to be burned. Fitted into this tube is a helical core 23, preferably of stainless steel, to impart to the incoming gas stream a helicoidal rotation with a substantially high velocity in the tangential plane. Attached to tube 22 is an extension 24 of relatively heavy material provided with a pattern of borings spaced radially about and longitudinally along the circumferences of the extension. As shown, these borings are drilled at oblique angles through the wall of this extension. Oxygen, entering through lateral tube 26 into the jacket 27, is blown through these borings so that the tangential components of the velocities of the two gases are directed oppositely to each other, whereby the oppositely rotatory flow of the two gases is gradually damped. Obviously, this type of mixer also permits a simple control of the velocity, the stream size and the impact angle of the two gases; these are the factors previously mentioned as essential to this invention. From the premixer, the gases enter the outflow tube 1 (FIG. 1) substantially without any turbulence, which is important in order to produce a regular and undisturbed flame at the end of the outflow tube and to avoid backfiring.

Experimental mixers of the described above types have been operated at velocities ranging from 20 to 120 m./sec. (type shown in FIG. 3) and from 15 to 100 m./sec. (type shown in FIG. 5). The load losses encountered thereby were found to be 475 kg./m.$^2$.

As a typical example, the following operative and constructional data are given: For a flow rate of 300 Nm.$^3$/hour of $CH_4$, it suffices if a premixer of the type illustrated in FIG. 3 has a flow cross-sectional area for the two gases of about 0.0015 m.$^2$. By shifting the position of obturator valve 19, the ratio between the cross-sectional areas of the flow of $CH_4$ and $O_2$ is varied, but the sum of these two cross-sectional areas always remains constant. The angle at the base of the double cone is, for example, 55°. In case of a premixer of the type illustrated in FIG. 5, the volume of the mixing chamber between the first and last row of borings 25 may vary from 900 to 1750 cc; the borings may have, for example, a diameter of 4 to 5 mm. each and their number may vary from 40 to 80. The residence time of the gases in the burner is preferably of the order of 0.012 sec. The flow rates may be so adjusted that, for example, an oxygen flow rate of about 230 Nm.$^3$/hour corresponds with a methane flow rate of 300 Nm.$^3$/hour. As a rule, the ratio of $O_2$ to $CH_4$ should be adjusted at between 0.5 and 0.8.

When the $O_2$ to $CH_4$ ratio is 0.72, a ratio at which no carbon black is formed, the stoichiometric equation of the process may be summarized as follows:

$$CH_4 + 0.72O_2 = 0.99CO + 1.66H_2 + 0.10CO_2 + 0.34H_2O$$

In this reaction summary the small amounts of residual methane which, as previously mentioned, are present in an amount of the order of 9.2% by volume, based on dry gas, are disregarded. Under these conditions, the amount of water vapors forming in the gaseous mixture is equal to about 10% by volume. The amount of water vapors tends to decrease when a $O_2/CH_4$ ratio lower than 9.72 is employed.

The afore-described process, carried out at atmospheric pressure, can be readily adapted for operation at higher pressure, for example, at the pressure at which natural gas is available, resulting in a substantial reduction of the energy requirements for the synthesis of ammonia and methanol.

I claim:

A gas mixer which comprises an inlet tube for gas, a helical core fitted within said inlet tube to impart helicoidal rotation to gas entering said inlet tube, a thick-walled extension on said inlet tube, a plurality of bores spaced longitudinally and circumferentially in the wall of the extension, the bores being disposed at an oblique angle to radial lines drawn perpendicular to the longitudinal axis of said extension, a jacket mounted about said extension, an inlet for a second gas for said jacket, the helix of the core and bores being so disposed that they cause the two gases to swirl in opposed directions against each other.

References Cited in the file of this patent

UNITED STATES PATENTS

| | | |
|---|---|---|
| 882,545 | Von Wouwermans | Mar. 17, 1908 |
| 1,462,756 | Ginger | July 24, 1923 |
| 1,500,103 | Burdon et al. | July 8, 1924 |
| 1,510,060 | Hoover et al. | Sept. 30, 1924 |
| 2,044,511 | Ryschkewitsch | June 16, 1936 |
| 2,353,865 | Armstrong | July 18, 1944 |
| 2,630,461 | Sachsse | Mar. 3, 1953 |
| 2,759,531 | Anthes | Aug. 21, 1956 |

FOREIGN PATENTS

| | | |
|---|---|---|
| 296,204 | Great Britain | Aug. 30, 1928 |
| 476,721 | Germany | May 28, 1929 |
| 518,884 | Belgium | Apr. 15, 1953 |
| 628,396 | France | June 27, 1927 |